United States Patent
Jiang et al.

(10) Patent No.: US 8,682,545 B2
(45) Date of Patent: Mar. 25, 2014

(54) DAMPING OSCILLATIONS DURING A GEAR RATIO CHANGE OF A DUAL CLUTCH POWERSHIFT TRANSMISSION

(75) Inventors: Hong Jiang, Canton, MI (US); Zhengyu Dai, Canton, MI (US); Matthew J. Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 616 days.

(21) Appl. No.: 12/815,849

(22) Filed: Jun. 15, 2010

(65) Prior Publication Data
US 2011/0307150 A1    Dec. 15, 2011

(51) Int. Cl.
*G06F 7/00*    (2006.01)

(52) U.S. Cl.
USPC .................... 701/54; 477/180; 192/103 C

(58) Field of Classification Search
USPC .................. 701/54; 477/77, 180; 192/103
See application file for complete search history.

(56) References Cited

U.S. PATENT DOCUMENTS

| | | | |
|---|---|---|---|
| 3,752,011 A * | 8/1973 | Casey et al. | 475/63 |
| 3,754,482 A * | 8/1973 | Sanders et al. | 475/120 |
| 4,527,678 A * | 7/1985 | Pierce et al. | 192/3.58 |
| 5,275,267 A | 1/1994 | Slicker | |
| 5,403,249 A | 4/1995 | Slicker | |
| 5,551,930 A * | 9/1996 | Creger et al. | 477/130 |
| 5,678,460 A | 10/1997 | Walkowc | |
| 5,967,942 A * | 10/1999 | Yuasa et al. | 477/156 |
| 6,078,856 A * | 6/2000 | Malson | 701/57 |
| 6,193,628 B1 * | 2/2001 | Hrovat et al. | 477/3 |
| 6,319,167 B1 | 11/2001 | Yoshida et al. | |
| 6,428,444 B1 | 8/2002 | Tabata | |
| 6,487,998 B1 | 12/2002 | Masberg et al. | |
| 6,574,535 B1 | 6/2003 | Morris et al. | |
| 7,315,774 B2 | 1/2008 | Morris | |
| 2009/0118945 A1 | 5/2009 | Heap et al. | |

* cited by examiner

*Primary Examiner* — Behrang Badii
*Assistant Examiner* — Daniel L Greene
(74) *Attorney, Agent, or Firm* — James Dottavio; MacMillan, Sobanski & Todd, LLC

(57) ABSTRACT

A method for controlling an upshift in a vehicle transmission includes transferring engine torque from an offgoing clutch to an oncoming clutch, using a torque capacity of the offgoing clutch to dampen oscillations when a difference between a speed of a transmission offgoing input and a calculated expected speed of said input is greater than a reference speed difference, and modulating engine torque during a ratio change phase of the shift.

19 Claims, 5 Drawing Sheets

US 8,682,545 B2

DAMPING OSCILLATIONS DURING A GEAR RATIO CHANGE OF A DUAL CLUTCH POWERSHIFT TRANSMISSION

BACKGROUND OF THE INVENTION

1. Field of the Invention

This invention relates generally to a vehicle powertrain, and, in particular, to controlling a ratio change with active damping of an off-going clutch of a dual input clutch transmission.

2. Description of the Prior Art

A dual clutch transmission (DCT), also called a powershift transmission, is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

Controlling noise vibration and harshness (NVH) in a vehicle powertrain that includes a powershift transmission is a challenge due to the lack of a damping device such as a torque converter located in a drive path between the engine and transmission. Seamless control of gear shifts while a powershift vehicle is operating is essential toward realizing the expected performance, fuel economy and NVH comfort. Due to the physical structure of the powershift transmission, especially in a dry clutch application, gear rattle associated with gear shift is a potential problem, especially when engaging a pre-selected gear during a gear shift.

A need exists in the industry for a gear shift control that minimizes gear rattle noise during a gear shift of a powershift transmission, preferably by providing active damping of an input clutch during the gear shift.

SUMMARY OF THE INVENTION

A method for controlling an upshift in a vehicle transmission includes transferring engine torque from an offgoing clutch to an oncoming clutch, using a torque capacity of the offgoing clutch to dampen oscillations when a difference between a speed of a transmission offgoing input shaft and a calculated expected speed of said input shaft is greater than a reference speed difference, and modulating engine torque during a ratio change phase of the shift.

The active damping control greatly reduces gear rattle noise during a gear shift in a powershift transmission, thereby enhancing its performance by reducing shift times.

The gear shift control causes the sound produced by a powershift transmission during a gear shift to be substantially identical and compatible to that of a conventional automatic transmission having epicyclic gearing and hydraulically actuated clutches and brakes, enabling the powershift vehicle to appeal to a broad customer base familiar with the shift-feel and sound of an automatic transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
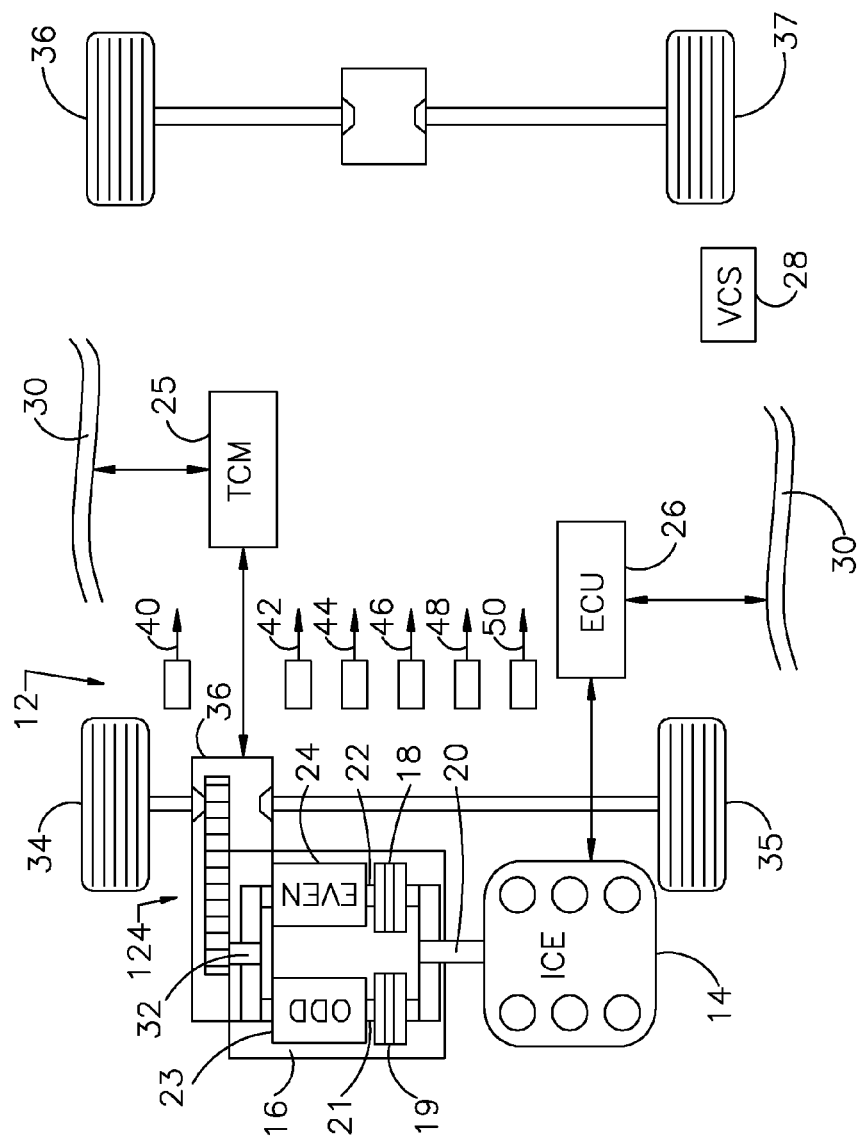
FIG. 1 is a schematic diagram of a vehicle powertrain system, to which ratio change control can be applied.

As shown in FIG. 1, a vehicle powertrain 12 includes an engine 14, such as a diesel or gasoline engine; and a transmission 16, preferably a dual clutch powershift transmission having two input clutches, but no torque converter.

The input clutches 18, 19 alternately connect shaft 20 to transmission inputs 21, 22 to the odd-numbered gears 23 and even-numbered gears 24, respectively. An electronic transmission control module (TCM) 25 controls the input clutches and gearbox state through command signals to servos that actuate the input clutches 18, 19 and gearbox shift forks and synchronizers. An electronic engine control module (ECU) 26 controls operation of engine 14. A vehicle control system (VCS) 28, issues control commands to the TCM and ECM carried on a communication bus 30. Each of the TCM 25, VCS 28 and ECM 46 includes a microprocessor accessible to electronic memory and containing control algorithms expressed in computer code, which are executed repeatedly at frequent intervals. The engine 14 provides vehicle propulsion by transmitting torque through transmission 16 to driven vehicle wheels 34, 35. Wheels 36, 37 are not driven.

The torque transmitting capacity of clutches 18, 19 varies in accordance with actuation of a servo under control of the TCM 25. Preferably each input clutch 18, 19 is actuated by a respective electric motor. The shaft of a first motor is connected to the plates of clutch 18, and the angular position of that shaft determines the torque transmitting capacity of clutch 18. Similarly, the shaft of a second motor is connected to the plates of clutch 19, and the angular position of that shaft determines the torque transmitting capacity of clutch 19. Alternatively, each clutch servo can be hydraulically actuated such that the torque capacity of each input clutch varies with a variable magnitude of hydraulic pressure supplied to the respective clutch.

Engine crankshaft torque varies in accordance with control signals sent to the engine from the ECU 26 in response to demanded wheel torque produced by the vehicle operator. Input signals produced by several sensors are transmitted on bus 30 to the TCM 25, ECU 26 and VCS 28. The input signals 42, 44, 46, 48, 50, 52 represent the speed of input 21, speed of speed 22, speed of the driven wheel 34, speed of the driven wheel 35, current operating gear of transmission 14, and speed of engine 14, respectively.

Figure 2:
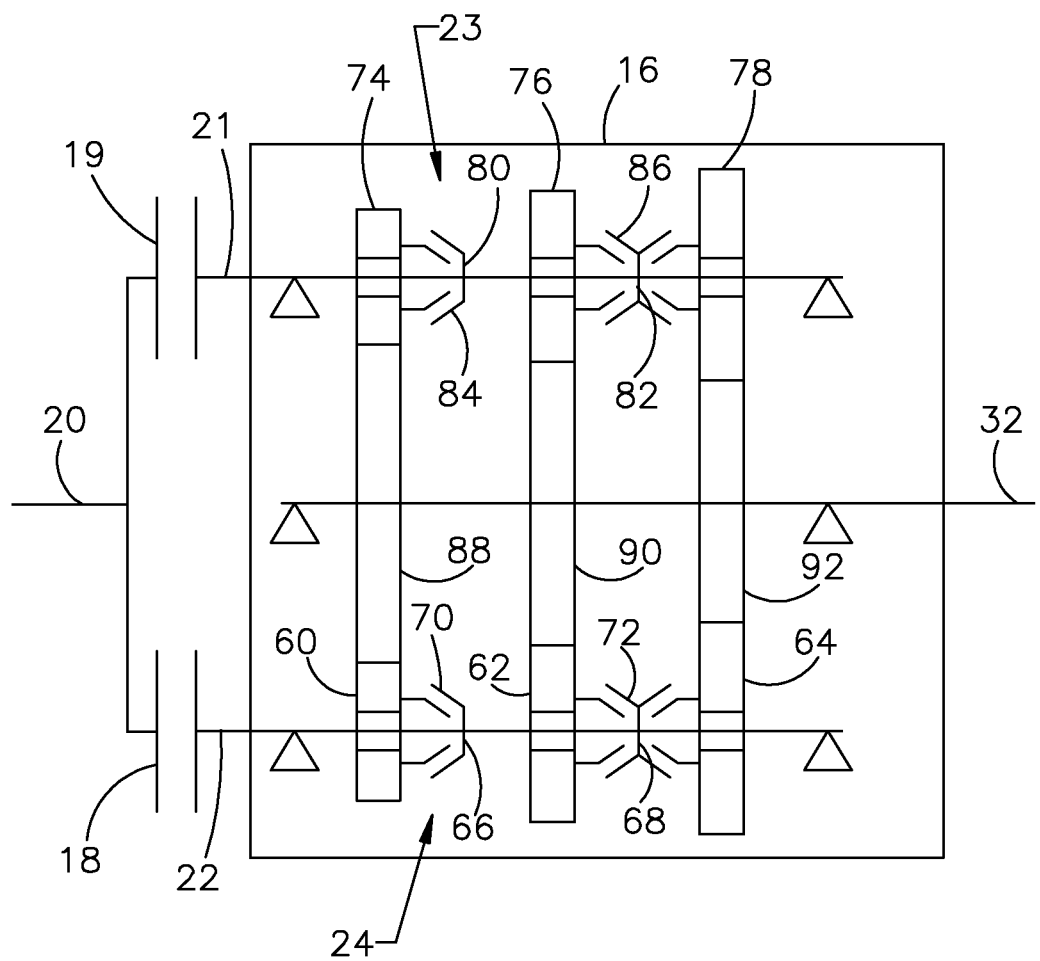
FIG. 2 is a schematic diagram showing details of a powershift transmission.

FIG. 2 illustrates details of a powershift transmission 16 including input clutch 18, which selective connects the input 20 of transmission 16 alternately to the even-numbered gears 24 associated with a input shaft 22, and input clutch 19, which selective connects the input 20 alternately to the odd-numbered gears 23 associated with a input shaft 21.

Layshaft 60 supports pinions 60, 62, 64, which are each journalled on shaft 22, and couplers 66, 68, which are secured to shaft 22. Pinions 60, 62, 64 are associated respectively with the second, fourth and sixth gears. Coupler 66 includes a sleeve 70, which can be moved leftward to engage pinion 60 and driveably connect pinion 60 to shaft 22. Coupler 68 includes a sleeve 72, which can be moved leftward to engage pinion and driveably connect pinion to shaft 22, and can be moved rightward to engage pinion 64 and driveably connect pinion 64 to shaft 22.

Shaft 21 supports pinions 74, 76, 78, which are each journalled on shaft 21, and couplers 80, 82, which are secured to shaft 21. Pinions 74, 76, 78 are associated respectively with the first, third and fifth gears. Coupler 80 includes a sleeve 84, which can be moved leftward to engage pinion 74 and driveably connect pinion 74 to shaft 21. Coupler 82 includes a sleeve 86, which can be moved leftward to engage pinion 76 and driveably connect pinion 76 to shaft 21, and can be moved rightward to engage pinion 78 and driveably connect pinion 78 to shaft 21.

Transmission output 32 supports gears 88, 90, 92, which are each secured to shaft 32. Gear 88 meshes with pinions 60 and 74. Gear 90 meshes with pinions 62 and 76. Gear 92 meshes with pinions 64 and 78.

Couplers 66, 68, 80 and 82 may be synchronizers, or dog clutches or a combination of these. Although operation of the transmission 16 is described with reference to forward drive only, the transmission can produce reverse drive by incorporating a reverse idler gear in one of the lower gear power paths and a reverse coupler for engaging reverse drive. One of the input clutches 18, 19 would be engaged when reverse drive operation is selected.

Although the gear shift control is described next with reference to a 1-2 upshift, the gear change can occur between gears that are consecutive or nonconsecutive, but preferably between gears associated with different shafts 22, 21.

Figure 3:
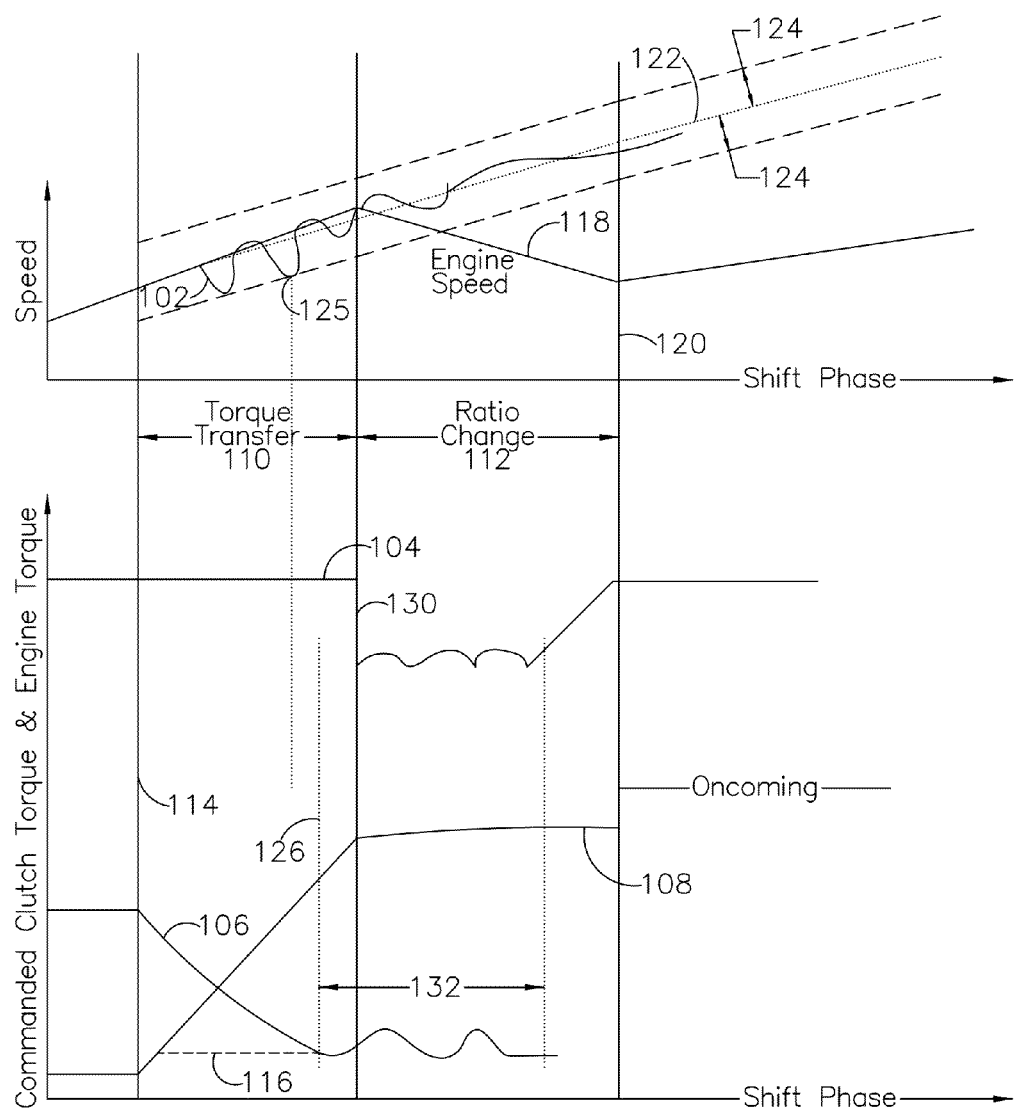
FIG. 3 are graphs that show the variation with time of several powertrain parameters during ratio change control.

FIG. 3 shows the variation of the speed 102 of the offgoing input 21, engine torque 104 and offgoing clutch 19 torque 106, and oncoming clutch 18 torque 108 during the torque transfer phase 110 and ratio change phase 112 of a 1-2 upshift. During the upshift, torque transmitted from engine 14 to input 21 through offgoing clutch 19 is transferred from the offgoing clutch to the oncoming clutch 18 during the torque transfer phase 100, but the gear in which transmission 16 operates remains first gear. The torque transfer phase 110 is followed by the ratio change phase 112, during which the operative gear changes from first gear to second gear.

Before a gear shift is commanded at 114, the torque transmitting capacity of clutch 19 is high and that of clutch 18 is substantially zero. The offgoing clutch 19 has a low torque reference 116, which is a positive torque close to zero.

Engine speed 118 increases before and during the torque transfer phase 110, decreases during the ratio change phase 112, and increases after the upshift is completed at 120.

The expected speed 122 of input 21 is calculated from the filtered output shaft speed 32, acceleration of the output shaft, the speed ratio of the final drive 124, and the speed ratio of the current transmission. The wheel speeds could also be used in place of the output shaft 32 speed and the acceleration of the output shaft 32 speed. The measured speed 102 of input 21 is shown in FIG. 3 oscillating about the expected speed 122 of input 21.

A reference speed difference 124 between the measured speed 102 and the expected speed 122 of input 21 is determined from a look-up table of calibrated values, whose magnitude is a function of engine speed and the gear shift being executed. If, as occurs at 125, the difference between the measured speed 102 and the calculated expected speed 122 of input 21 is greater than the reference speed difference 124, and the torque capacity of offgoing clutch 19 is equal to or greater than the low torque reference 116, then active damping begins at 126 by maintaining a variable, positive torque capacity of the offgoing clutch 19, thereby maintaining positive torque on the offgoing power path through transmission 16 to the driven wheels 34, 35 and reducing the probability of gear rattle occurring.

The magnitude of the increase in torque capacity of clutch 19 is determined from a look-up table as a function of the actual difference between the measured speed 102 and the expected speed 122 of input 21. Active damping continues during each execution of the control algorithm until the shift is completed.

In order to shorten the period during which the gear shift occurs, engine torque is decreased to compensate for engine inertia. The decrease in engine torque causes the engine speed to decrease faster, which shortens the shift duration. When active damping is enabled, keeping positive torque on the off-going input shaft can possibly increase the duration of the shift. The gear shift duration is maintained by using a closed-loop controller to further decrease the engine torque at 130 and continues to modulate engine torque while the torque capacity of clutch 19 is being used for active damping. The closed loop controller uses at least one of engine ignition spark timing, engine intake air flow rate, and engine fuel flow rate to modulated and control engine torque. The variable magnitude of offgoing clutch torque during the active damping period 132 is used as a reference to determine the desired magnitude of engine torque during period 132.

Figure 4A:
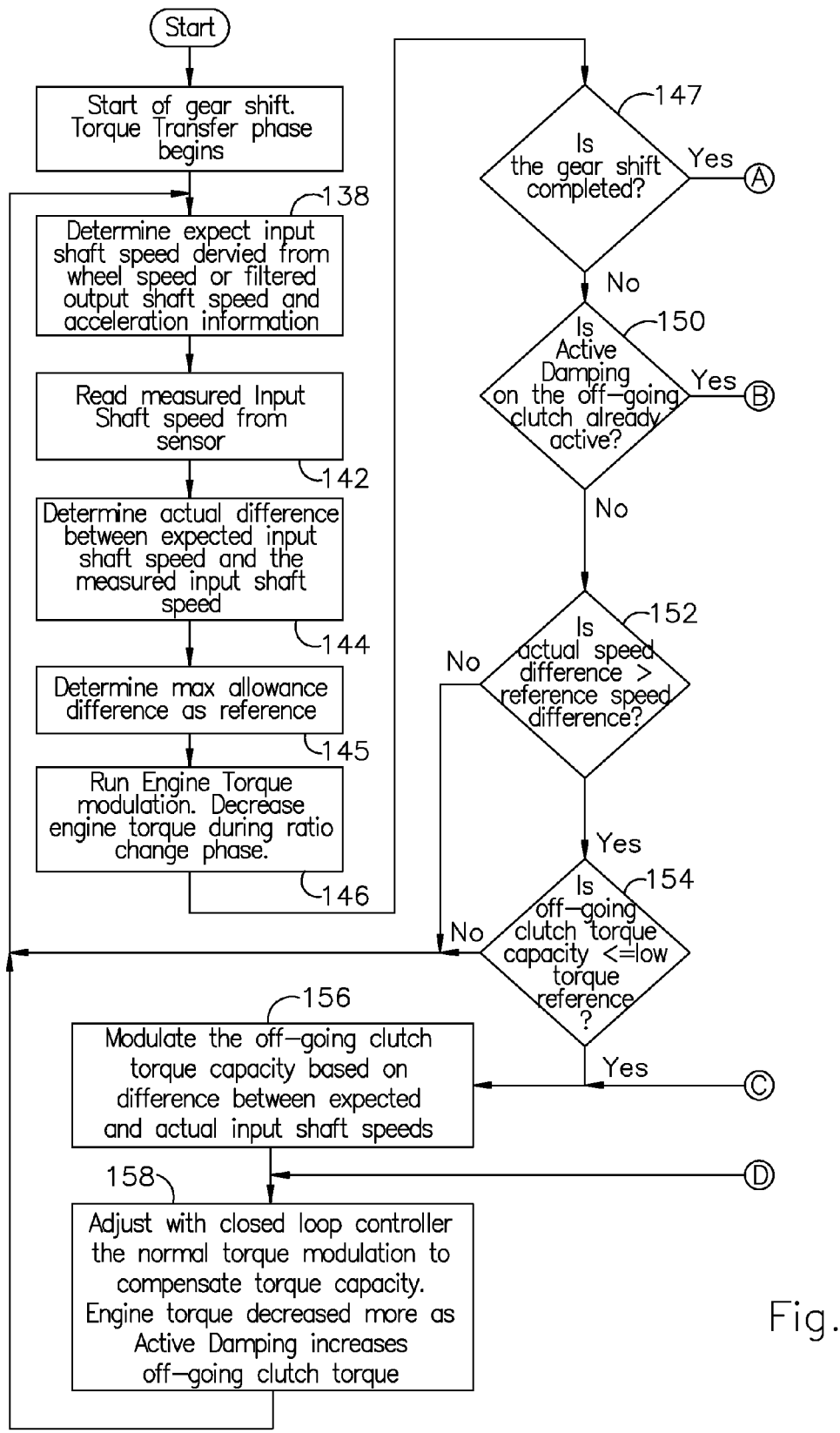
FIGS. 4A and 4B is a flow diagram illustrating the ratio change control method steps.
Figure 4B:
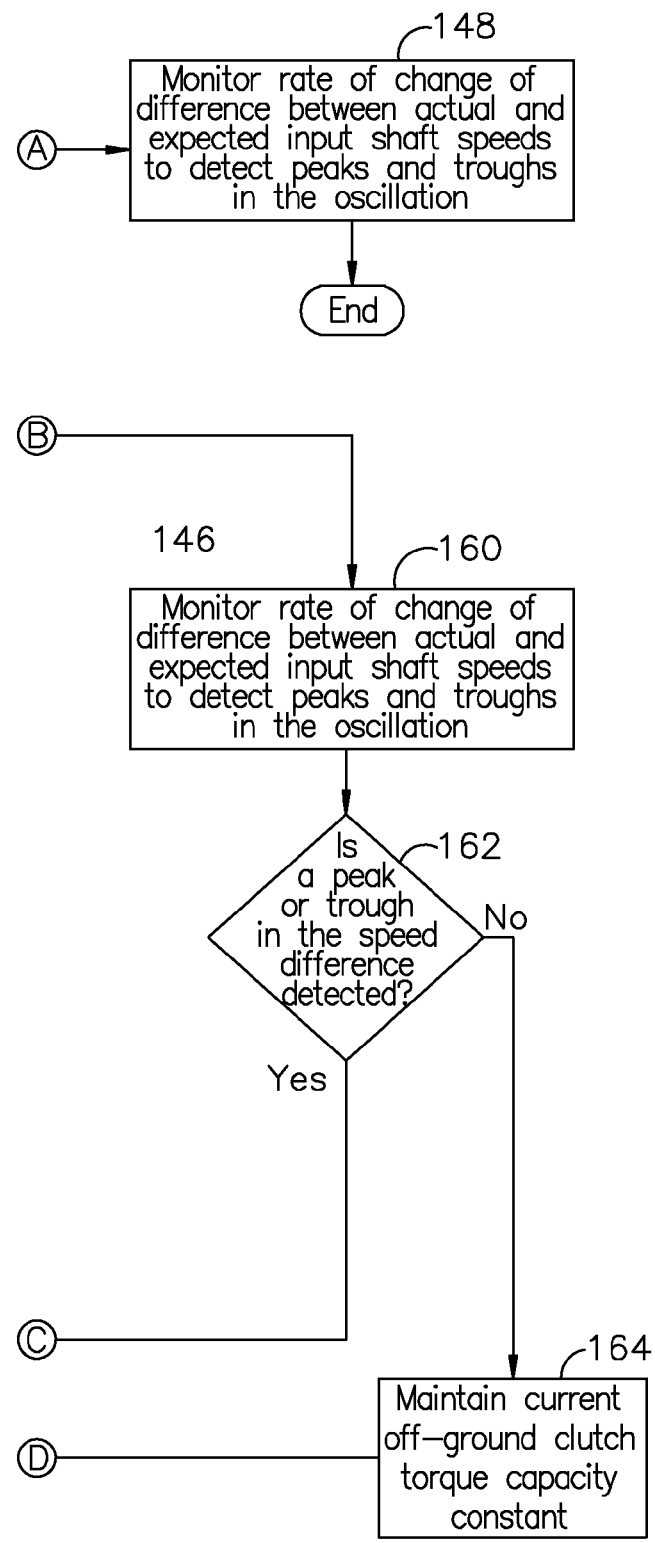

The steps of an algorithm for controlling a gear shift of transmission 16 are shown in the method steps flow diagram illustrated in FIGS 4A and 4B.

At step 138, the expected speed 122 of input 21 is calculated from the filtered speed output shaft 32, acceleration of the output shaft 34, 35, the speed ratio of the final drive 124, and the speed ratio of the current operating gear of the transmission. The speeds of the wheels 34, 35 can also be used in place of the output shaft speed 32, and the acceleration of the output shaft.

At step 142, the measured speed 102 of input 21 is determined from a speed sensor.

At step 144, a reference speed difference 124 between the measured speed 102 and the expected speed 122 of the off-going input 21 is determined.

At step 145 a maximum allowable speed difference is determined as a reference.

At step 146 engine torque modulation is run to decrease engine torque during a ratio change phase of the gearshift.

At step 147, a test is made to determine whether the gear shift is completed. If the result of test 147 is logically positive, at step 148 the offgoing clutch is fully opened, its torque capacity is zero, engine torque is ramped back to normal, and the active damping control ends.

If the result of test 147 is logically false, at step 150 a test is made to determine whether active damping of the offgoing clutch is active.

If the result of test 150 is false, at step 152 a test is made to determine whether the difference between the measured speed 102 and the expected speed 122 of the offgoing input is greater than the reference speed difference 124.

If the result of test 152 is true, at step 154 a test is made to determine whether the torque capacity of the offgoing clutch is equal to or less than the low torque reference 116.

If the result of test 152 and test 154 is true, then active damping begins at step 156 by modulating the torque capacity of the offgoing clutch. Active damping continues during each execution of the control algorithm until the gear shift is complete. When the shift is complete, the off-going clutch torque capacity is ramped down to zero.

If the result of either test 152 or test 154 is false, control returns to step 138.

At step 158, engine torque is decreased and a closed loop controller continues to modulate engine torque while the torque capacity of the offgoing clutch is producing active damping, after which control returns to step 138.

If the result of test 150 is true, at step 160 the rate of change of the difference between actual and expected input shaft speed is monitored to detect peaks and troughs in the oscillation.

At step 162, a test is made to determine whether a peak or a trough in the sped difference is detected. If the result of test 162 is false, at step 164 the current torque capacity of the offgoing clutch is maintained constant.

If the result of test 162 is true, control advances to step 156 where modulation of the torque capacity of the offgoing clutch occurs. Active damping continues during each execution of the control algorithm until the gear shift is complete. When the shift is complete, the off-going clutch torque capacity is ramped down to zero.

In accordance with the provisions of the patent statutes, the preferred embodiment has been described. However, it should be noted that the alternate embodiments can be practiced otherwise than as specifically illustrated and described.

The invention claimed is:

1. A method for controlling an upshift in a vehicle transmission, comprising:
   (a) transferring engine torque from an offgoing clutch to an oncoming clutch;
   (b) using a torque capacity of the offgoing clutch to dampen oscillations when a difference between actual and expected speed of a transmission offgoing input exceeds a reference difference;
   (c) modulating engine torque during a ratio change phase of the shift.

2. The method of claim 1, wherein step (a) is performed during a torque transfer phase of the shift.

3. The method of claim 1, further comprising using the oncoming clutch to transmit engine torque to the transmission.

4. The method of claim 1, wherein step (b) further comprises:
   calculating an expected speed of the transmission offgoing input;
   measuring the speed of the offgoing input; and
   determining a difference between said expected speed and said measured speed.

5. The method of claim 1, wherein step (b) further comprises:
   calculating the expected speed of the transmission offgoing input using one of a speed of a vehicle wheels, speed and acceleration of the output shaft, a speed ratio of a final drive of the vehicle, and a speed ratio of a current transmission gear;
   measuring the speed of the offgoing input; and
   determining a difference between said expected speed and said measured speed.

6. The method of claim 1, wherein step (b) is performed when the torque capacity of the offgoing clutch is equal to or less than a reference positive torque.

7. The method of claim 1, wherein step (b) further comprises:
   changing the torque capacity of the offgoing clutch in response to a difference between said reference speed difference and said difference between the speed of the transmission offgoing input and a calculated expected speed of said input.

8. The method of claim 1, wherein step (c) further comprises:
   decreasing engine torque; and
   modulating engine torque while the torque capacity of the offgoing clutch is used to dampen oscillations.

9. The method of claim 1, wherein step (c) further comprises:
   increasing engine torque; and
   increasing a torque capacity of the oncoming clutch.

10. A method for controlling an upshift in a vehicle transmission, comprising:
    (a) transferring engine torque from an offgoing clutch to an oncoming clutch;
    (b) changing a torque capacity of the offgoing clutch in proportion to a magnitude of a difference between a reference speed difference and a difference between a speed of a transmission offgoing input and a calculated average speed of said transmission offgoing input;
    (c) modulating engine torque during a ratio change phase of the shift.

11. The method of claim 10, further comprising using the oncoming clutch to transmit engine torque to the transmission.

12. The method of claim 10, wherein step (b) further comprises:
    calculating the calculated speed of the transmission offgoing input;
    measuring the speed of the offgoing input; and
    determining a difference between said calculated average speed and said measured speed.

13. The method of claim 10, wherein step (b) further comprises:
    calculating the calculated average speed of the transmission offgoing input using a speed of a vehicle wheel, a speed ratio of a final drive of the vehicle, and a speed ratio of a current transmission gear;
    measuring the speed of the offgoing input; and
    determining a difference between said calculated average speed and said measured speed.

14. The method of claim 10, wherein step (b) is performed when the torque capacity of the offgoing clutch is equal to or less than a reference positive torque.

15. The method of claim 10, wherein step (c) further comprises:
    decreasing engine torque; and
    modulating engine torque while the torque capacity of the offgoing clutch is used to dampen oscillations.

16. The method of claim 10, wherein step (c) further comprises:
    increasing engine torque; and
    increasing a torque capacity of the oncoming clutch.

17. A method for controlling an upshift in a vehicle transmission, comprising:

(a) transferring engine torque from an offgoing clutch to an oncoming clutch during a torque transfer phase;
(b) during a ratio change phase, changing a torque capacity of the offgoing clutch in response to a magnitude of a difference between a reference speed difference and a difference between a speed of a transmission offgoing input and a calculated expected speed of said input.

18. The method of claim 17, further comprising modulating engine torque during the ratio change phase of the shift.

19. The method of claim 17, wherein step (b) is performed when the torque capacity of the offgoing clutch is equal to or less than a reference positive torque.

* * * * *